(12) United States Patent
Prasad et al.

(10) Patent No.: US 8,843,535 B2
(45) Date of Patent: Sep. 23, 2014

(54) FRAMEWORK FOR APPLYING METADATA FOR MULTIPLE FILES MANAGED USING A CONTENT MANAGEMENT SYSTEM

(75) Inventors: Shyam Babu Prasad, Bangalore (IN); Alan Wiersba, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/532,315

(22) Filed: Jun. 25, 2012

(65) Prior Publication Data

US 2013/0346455 A1 Dec. 26, 2013

(51) Int. Cl.
G06F 12/00 (2006.01)
G06F 17/30 (2006.01)

(52) U.S. Cl.
CPC .............. *G06F 17/30079* (2013.01)
USPC ....................................... 707/825

(58) Field of Classification Search
None
See application file for complete search history.

(56) References Cited

U.S. PATENT DOCUMENTS

| | | | |
|---|---|---|---|
| 6,629,104 B1 | 9/2003 | Parulski et al. | |
| 7,266,563 B2 | 9/2007 | Morris et al. | |
| 7,962,634 B2 | 6/2011 | Cortos et al. | |
| 8,010,896 B2 | 8/2011 | Petri | |
| 2004/0001106 A1* | 1/2004 | Deutscher et al. | 345/838 |
| 2006/0230452 A1* | 10/2006 | Field | 726/22 |
| 2008/0250034 A1 | 10/2008 | Petri | |
| 2010/0036909 A1 | 2/2010 | Lee et al. | |
| 2010/0281084 A1* | 11/2010 | Gupta et al. | 707/822 |
| 2011/0040754 A1 | 2/2011 | Peto et al. | |
| 2011/0078114 A1 | 3/2011 | Herbeck et al. | |
| 2011/0246294 A1 | 10/2011 | Robb et al. | |
| 2012/0079013 A1* | 3/2012 | Shepstone | 709/203 |
| 2012/0304247 A1* | 11/2012 | Badger et al. | 726/1 |

OTHER PUBLICATIONS

AVS44YOU Programs Help, Online Media Technologies, Ltd, UK, 2010.*
Author Unknown, "Document Classification and Metadata Capture in Document and Records Management software," Filehold, Electronic Document Management Software Metadata Tagging—Paper Office Management, retrieved from http://www.filehold.com/features/standard/metadata on Nov. 18, 2011, 2 pages.
Author Unknown, "SharePoint Document Management," Apps4Rent, retrieved from http://www.apps4rent.com/sharepoint-document-management.html on Nov. 18, 2011, 2 pages.

* cited by examiner

*Primary Examiner* — Jay Morrison
(74) *Attorney, Agent, or Firm* — Kilpatrick Townsend & Stockton LLP

(57) ABSTRACT

Various arrangements for applying metadata to multiple files managed by a content management system are presented. A user computer system may receive an indication of a plurality of files for uploading from the user computer system for storage and management to the content management system. The plurality of files may be stored in a location managed by the content management system. A metadata field may be required for each file of the plurality of files. The user computer system may provide an interface that requests a value of the metadata field. The interface may provide an apply-to-all option for the value of the metadata field to be applied to each file of the plurality of files. The user computer system may apply the value of the metadata field to each file of the plurality of files for uploading for storage and management to the content management system.

20 Claims, 11 Drawing Sheets

FRAMEWORK FOR APPLYING METADATA FOR MULTIPLE FILES MANAGED USING A CONTENT MANAGEMENT SYSTEM

BACKGROUND

Content management systems have become commonplace for enterprises (e.g., businesses). A content management system (CMS) allows for files (e.g., documents) to be centrally stored and managed and facilitates the management of workflow in a collaborative environment where multiple users may need access to the same files. Such files can be remotely accessed (such as for viewing and/or editing) by users having the appropriate permissions.

Associated with files maintained by a CMS may be metadata. Metadata may provide information about the associated file. For instance, the metadata may be used for search purposes, filing purposes, and/or permission purposes. When a user uploads or otherwise provides a file to a CMS for storage and management, the user may be prompted to input various pieces of metadata for the file. If the user is uploading multiple files to the CMS, this may be tedious because the metadata may need to be separately provided for each file uploaded to the CMS.

SUMMARY

Various arrangements for applying metadata to multiple files managed by a content management system are presented. In some embodiments, a method for applying metadata to multiple files managed by a content management system is presented. The method may include receiving, by a user computer system, an indication of a plurality of files for uploading from the user computer system to the content management system. The plurality of files may be going to be stored in a location managed by the content management system. The method may include receiving, by the user computer system, an indication of a metadata field required for each file of the plurality of files. The method may include providing, by the user computer system, an interface that requests a value for the metadata field for a first file of the plurality of files to be uploaded to the content management system. The interface may provide an apply-to-all option for the value of the metadata field to be applied to each file of the plurality of files. The method may include providing, by the user computer system, the value of the metadata field for each file of the plurality of files to the content management system.

Embodiments of such a method may include one or more of the following: Providing the interface that requests the value of the metadata field for the first file of the plurality of files for uploading to the content management system may occur in response to the content management system determining the value for the metadata field is required to be provided. Prior to receiving the plurality of files, the method may include receiving, by the content management system, an indication of the metadata field from an administrator, wherein the indication specifies the metadata field is required to be provided for files to be stored in the location of the content management system. The indication may comprise a selection of a metadata category. The metadata category may specify a plurality of metadata fields. At least some metadata fields of the plurality of metadata fields may be specified as mandatory. The method may include, after providing, by the user computer system, the value of the metadata field supplied by a user for each file of the plurality of files to the content management system, receiving, by the user computer system, an indication of a second file for uploading to be stored in the location by the content management system. The second file may not part of the plurality of files. The method may include determining, by the user computer system, the apply-to-all option was activated in relation to the plurality of files. The method may include providing, by the user computer system, the value of the metadata field for the second file to the content management system.

Embodiments of such a method may also include one or more of the following: The method may include, after providing the value of the metadata field for each file of the plurality of files to the content management system, receiving, by the content management system, a second indication of a second metadata field. The indication may specify the second metadata field is required for files uploaded to the location of the content management system. The method may include, after providing the value of the metadata field supplied by a user for each file of the plurality of files to the content management system, receiving, by the user computer system, an indication of a second file to be stored in the location by the content management system. The second file may not be part of the plurality of files. The method may include determining, by the user computer system, the apply-to-all option was activated in relation to the plurality of files. The method may include providing, by the user computer system, the value of the metadata field for the second file to the content management system. The method may include providing, by the user computer system, a second interface that requests a second value of the second metadata field for the second file to be uploaded for storage and management to the content management system. The method may include receiving, by the content management system, from the user computer system, the value for the metadata field. The location may be a folder managed by the content management system.

In some embodiments, a computer program product residing on a non-transitory processor-readable medium for applying metadata to multiple files managed by a content management system is presented. The computer program product may comprise processor-readable instructions configured to cause a processor to receive an indication of a plurality of files for uploading to the content management system. The plurality of files may be stored in a location managed by the content management system. The computer program product may comprise processor-readable instructions configured to cause the processor to receive an indication of a metadata field required for files to be stored in the location. The computer program product may comprise processor-readable instructions configured to cause the processor to provide an interface that requests a value of the metadata field for a first file of the plurality of files to be uploaded to the content management system. The interface may provide an apply-to-all option for the value of the metadata field to be applied to each file of the plurality of files. The computer program product may comprise processor-readable instructions configured to cause the processor to provide the value of the metadata field for each file of the plurality of files to the content management system.

Embodiments of such a computer program product may include one or more of the following: The processor-readable instructions may be further configured to cause the processor to, after providing the value of the metadata field supplied by a user for each file of the plurality of files to the content management system, receive an indication of a second file for uploading to be stored in the location by the content management system. The second file may not be part of the plurality of files. The computer program product may comprise processor-readable instructions configured to cause the processor to determine the apply-to-all option was activated in relation to the plurality of files. The computer program product may comprise processor-readable instructions configured to cause the processor to provide the value of the metadata field for the second file to the content management system. The computer program product may comprise processor-readable instructions configured to cause the processor to, after providing the value of the metadata field supplied by the user for each file of the plurality of files to the content management system, receive an indication of the second file to be stored in the location by the content management system. The second file may not be part of the plurality of files. The computer program product may comprise processor-readable instructions configured to cause the processor to determine the apply-to-all option was activated in relation to the plurality of files. The computer program product may comprise processor-readable instructions configured to cause the processor to provide the value of the metadata field for the second file to the content management system. The computer program product may comprise processor-readable instructions configured to cause the processor to provide a second interface that requests a second value of a second metadata field for the second file to be uploaded for storage and management to the content management system. The location may be a folder managed by the content management system.

In some embodiments, a system for applying metadata to multiple files is presented. The system may include a user computer system. The system may also include a content management system communicatively coupled with the user computer system. The user computer system may be configured to execute processor-readable instructions configured to cause a processor of the user computer system to receive an indication of a plurality of files for uploading from the user computer system for storage and management to the content management system. The plurality of files may be uploaded to be stored in a location managed by the content management system. The user computer system may be configured to execute processor-readable instructions configured to cause the processor of the user computer system to receive an indication of a metadata field required for each file of the plurality of files from the content management system. The user computer system may be configured to execute processor-readable instructions configured to cause the processor of the user computer system to provide an interface that requests a value of the metadata field for a first file of the plurality of files to be uploaded for storage and management to the content management system. The interface may provide an apply-to-all option for the value of the metadata field to be applied to each file of the plurality of files. The user computer system may be configured to execute processor-readable instructions configured to cause the processor of the user computer system to provide the value of the metadata field for each file of the plurality of files to the content management system.

Embodiments of such a system may include one or more of the following: The processor-readable instructions configured to cause the processor of the user computer system to provide the interface that requests the value of the metadata field for the first file of the plurality of files may occur in response to receiving an indication from the content management system that the value for the metadata field is required to be provided. The content management system may be configured to execute processor-readable instructions configured to cause a processor of the content management system to, prior to receiving the plurality of files, receive an indication of the metadata field from an administrator. The indication may specify the metadata field is required to be provided for files to be stored in the location of the content management system. The indication may comprise a selection of a metadata category. The metadata category may specify a plurality of metadata fields. At least some metadata fields of the plurality of metadata fields may be specified as mandatory. The user computer system may be configured to execute processor-readable instructions configured to cause the processor of the user computer system to, after providing the value of the metadata field supplied by a user for each file of the plurality of files to the content management system, receive an indication of a second file for uploading to be stored in the location by the content management system. The second file may not part of the plurality of files. The user computer system may be configured to execute processor-readable instructions configured to cause the processor of the user computer system to determine the apply-to-all option was activated in relation to the plurality of files. The user computer system may be configured to execute processor-readable instructions configured to cause the processor of the user computer system to provide the value of the metadata field for the second file to the content management system.

Further, embodiments of such a system may include one or more of the following: The content management system may be further configured to execute processor-readable instructions configured to cause the processor of the content management system to receive a second indication of a second metadata field. The indication may specify the second metadata field is required to be provided for files uploaded to the location of the content management system. The user computer system may further be configured to execute processor-readable instructions configured to cause the processor of the user computer system to, after providing the value of the metadata field supplied by a user for each file of the plurality of files to the content management system, receive an indication of a second file to be stored in the location by the content management system. The second file may be part of the plurality of files. The user computer system may be configured to execute processor-readable instructions configured to cause the processor of the user computer system to determine the apply-to-all option was activated in relation to the plurality of files. The user computer system may be configured to execute processor-readable instructions configured to cause the processor of the user computer system to provide the value of the metadata field for the second file uploaded for storage and management to the content management system. The user computer system may be configured to execute processor-readable instructions configured to cause the processor of the user computer system to provide a second interface that requests a second value of the second metadata field for the second file to be uploaded for storage and management to the content management system. The content management system may be further configured to execute processor-readable instructions configured to cause the processor of the content management system to receive the value for the metadata field from the user computer system. The location may be a folder managed by the content management system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 5 illustrates an embodiment of a user interface that prompts a user to enter multiple metadata values for a file provided to a content management system for storage and management.

FIG. 6 illustrates an embodiment of the user interface of FIG. 5 in which the user has provided multiple metadata values and activated an apply-to-all option.

DETAILED DESCRIPTION

Figure 1A:
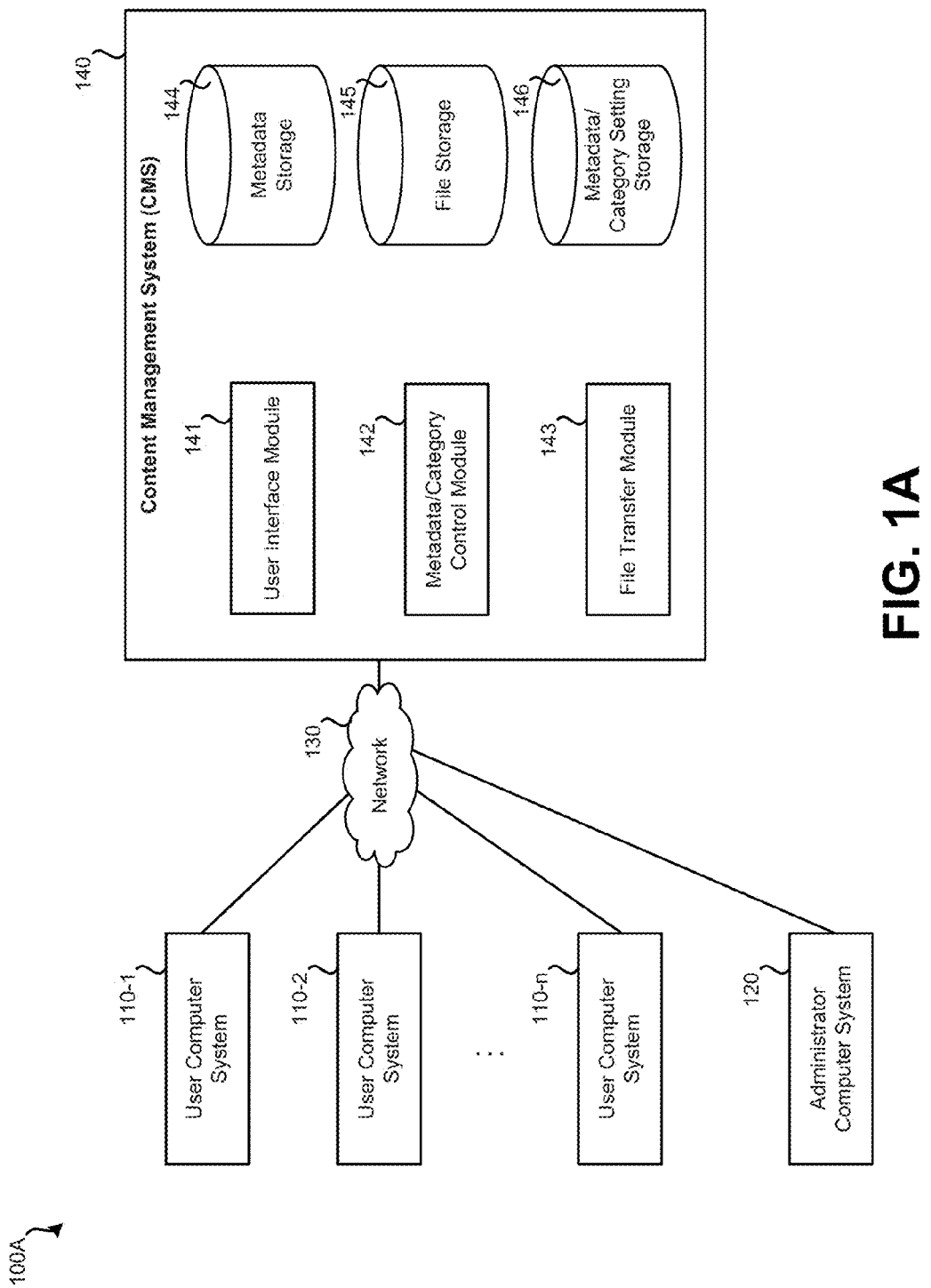
FIG. 1A illustrates an embodiment of a system configured to apply metadata to multiple files managed by a content management system.

A content management system (CMS) may be used to centrally store and/or manage multiple files for an enterprise, such as a business. A CMS can facilitate the management of workflow in a collaborative environment where multiple users need access to the same files. Such files can be remotely accessed (such as for viewing and/or editing) by users having the appropriate permissions. As an example of a function a CMS may provide, when a first user is interacting with a document stored as a file by the CMS, others users may be blocked from modifying this document until the first user has relinquished control of the document.

For purposes such as organization, management, and/or searching, metadata may be stored in conjunction with some or all files maintained by a CMS. Metadata may provide information about a particular associated file. For instance, the metadata may provide information for a file such as a date, an author name, whether contents of the file have been verified, etc. The specific types of metadata that are permitted and/or required for a file may vary based on the enterprise which is maintaining the CMS. Further, depending on the location of the CMS that the file is to be stored in, the types of metadata required (if any) may vary. For instance, a first folder managed by the CMS may require that a user provide values for particular metadata fields, while a second folder may require values for fewer, additional, and/or different metadata fields.

When a user uploads or otherwise provides a file to a CMS for storage and management, the user may be prompted to input various pieces of metadata for the file. Typically, if the user is uploading multiple files to the CMS, metadata for each file may need to be separately provided to the CMS. In contrast, embodiments detailed herein allow metadata values provided for a particular file (or folder) to be applied to additional files stored to the same location of the CMS.

When a user attempts to upload or otherwise provide multiple files to a CMS, the user may specify a location of the CMS where the files are desired to be stored. Such a location may be a folder or some other form of location delineation used by the CMS, such as a client number and/or matter number. The CMS may check to determine if values for any metadata fields are required for the selected location. If so, the CMS may prompt the user to provide values for the required metadata fields for a first file of the multiple files. The user may also be prompted with an apply-to-all option.

If the user activates the apply-to-all option, the metadata provided by the user may be applied to the remainder of the files being uploaded to the same location. As such, for a group of multiple files provided to the CMS for maintenance at a particular location by the user, metadata values may only need to be provided once. The activation of the apply-to-all option may persist for the user and location for a time. For example, the activation of the apply-to-all option may remain active for the user's current session with the CMS. As such, after providing the one or more files to the CMS, the user may provide (e.g., upload) another file to the same location. The metadata values previously provided by the user may be applied to the latest uploaded file without requiring additional user input.

The user may have specified metadata values and activated apply-to-all options that apply to multiple locations (e.g., folders). As such, a file uploaded to a first folder may be linked to a first set of metadata values without additional input being required from the user, while a file uploaded to a second folder may be associated with a second set of metadata values (which may correspond to the same and/or different metadata fields as the first folder) without additional input being required for the user. In some embodiments, if a user has activated an apply-to-all option for a location of a CMS and a file requires one or more additional metadata values, the values associated with the activated apply-to-all option may be applied without additional user input being required, and the user may only be prompted for the one or more additional metadata values.

FIG. 1A illustrates an embodiment of a system 100A configured to apply metadata to multiple files managed by a content management system. System 100A may include user computer systems 110, administrator computer system 120, network 130, and content management system (CMS) 140. CMS 140 may include: user interface module 141, metadata/category control module 142, file transfer module 143, metadata storage database 144, file storage database 145, and metadata/category setting storage database 146.

Each user computer system of user computer systems 110 may represent an end-user's computer system that is configured to communicate with CMS 140. Each of user computer systems 110 may be configured to transmit one or more files to CMS 140 for storage and management. Further, each of user computer systems 110 may be configured to allow users to add metadata values to be associated with metadata fields for files provided to and/or stored by CMS 140. A user may be required to log into each of user computer systems 110 and/or CMS 140 via a user computer system of user computer systems 110. In various embodiments, one, two, or more than two user computer systems 110 may be present. For example, in embodiments where CMS 140 manages content for a large enterprise, hundreds or thousands of user computer systems 110 may be present that are configured to communicate with CMS 140.

Administrator computer system 120 may represent a computer system that is the similar or the same as a user computer system of user computer systems 110. Administrator computer system 120 may represent a computer system operated by an administrator that has additional permissions over a typical end-user. For example, an administrator may be permitted to modify which metadata fields and/or metadata categories are required (and/or permitted) for particular storage locations on CMS 140; while a user, using a user computer system such as user computer system 110-1, may be permitted to provide metadata values but not modify which metadata fields are required and/or permitted. While a single administrator computer system 120 is illustrated as part of system 100A, it should be understood that additional administrators may be permitted to modify which metadata fields are required and/or permitted for locations of CMS 140 via additional administrator computer systems.

Network 130 may represent one or more public and/or private networks that are used for communication between CMS 140, user computer systems 110, and administrator computer system 120. A public network that network 130 may include is the Internet; a private network that network 130 may include is a corporate intranet. For example, user computer system 110-1 may be operated from a user's home and may use the Internet and a corporate intranet to communicate with CMS 140, while user computer system 110-2 may be located at a facility of the business entity and may communicate with CMS 140 via the corporate intranet.

Content management system 140 may include one or more computer systems that store and/or manage content. Such content may be in the form of files. Such files may include documents, images, and/or other types of files. Once a file is provide to CMS 140, the file may be managed such that only a single user can edit the file at a given time. CMS 140 may also make the file available to all users across the enterprise with sufficient permissions to access the file and/or the location where the file is stored.

When a user possesses, such as at a user computer system, a file that the user desires to have managed and stored by CMS 140, the user may initiate a file transfer from the user computer system, such as user computer system 110-1, via network 130, to CMS 140. File transfer module 143 may be configured to receive individual files and/or batch transfers of files from user computer systems 110 (and/or administrator computer system 120). When file transfer module 143 receives a file, a location may be specified as part of the transfer. For example, the location may be a folder maintained by CMS 140. A location may also be in some form other than a folder. For example, client numbers, matter numbers, or some other identifier may be used to group files at CMS 140. Each of such types of identifiers may be referred to as a type of location.

While one or more files are received for management by CMS 140, metadata/category control module 142 may determine which, if any, metadata values are required for the one or more files. Which metadata values are required for metadata fields may be based at least partially on the location of CMS 140 where the one or more files are to be stored. Metadata/category control module 142 may inspect metadata/category setting storage database 146 to determine which metadata values are required and/or are permitted for files uploaded to the location specified as part of the file transfer.

A metadata category refers to a group of metadata fields. For instance, a particular metadata category may require several metadata values be provided. A metadata category may be created, such as, for example, an "Invoice" metadata category. As part of this metadata category, multiple metadata fields which are useful in conjunction with invoices may be specified. For each metadata field, a name may be specified (e.g., author, date, etc.) and type may be specified (e.g., string, number, date, true/false). As such, a location of CMS 140 may be associated with one or more metadata fields that are individually specified and/or one or more metadata categories, each of which contain one or more metadata fields. Once a metadata category is created, the same category may be associated with multiple locations. Accordingly, this may cause a common set of metadata fields to be required for the multiple locations.

If metadata/category control module 142 determines that one or more metadata values are required for the one or more files being uploaded to CMS 140 from a user computer system of user computer systems 110, user interface module 141 may cause a user interface to be rendered by the user computer system to the user. The user interface may request the necessary (and/or optional) metadata values be provided for the metadata fields. The user interface created by user interface module 141 may allow the user to specify individual metadata values for each file being uploaded for management to CMS 140. The user interface may provide the user with an apply-to-all option that, when activated, applies the input metadata values to all files uploaded by the user to the location. The metadata values submitted by the user may be: 1) associated with the one or more files and stored in metadata storage 144; and 2) if the apply-to-all option is activated, stored by the user's user computer system and/or CMS 140 in case the user uploads additional files to the same location, in which case the metadata values would also be applied to these files.

User interface module 141 may be configured to cause multiple different user interfaces to be presented to the user uploading the one or more files for management. FIGS. 2 through 6 illustrate various embodiments of user interfaces that user interface module 141 may cause to be presented.

File storage database 145 may represent a database of the files managed by CMS 140 stored on one or more non-transitory computer-readable mediums, such as hard drives. As such, a file uploaded to CMS 140 for management may be stored within file storage database 145. Metadata storage 144 may represent a database of the metadata values associated with the files managed by CMS 140 stored on the one or more non-transitory computer-readable mediums. Therefore, the metadata values of the files uploaded to CMS 140 for management may be stored by metadata storage 144. While FIG. 1 illustrates the metadata for files stored in file storage database 145 as maintained separately in metadata storage 144, it should be understood that in other embodiments storage may be within the same database and/or storage device. Metadata/category setting storage database 146 may store indications of which metadata fields are required and/or are optional for various locations of file storage database 145.

Administrators (who may be users with increased permissions), via administrator computer system 120, may be able to set and/or modify which individual metadata fields and/or metadata categories are associated with storage locations of CMS 140. Via network 130, an administrator may be permitted to select a location of file storage database 145 and view and/or modify its properties. A user may view the properties. Such an action may trigger user interface module 141 to present the user or administrator with a user interface that indicates the individual metadata fields and/or metadata categories associated with the location. The administrator, depending on his permissions, may be permitted to view, add, subtract, or modify the required and/or optional individual metadata fields and/or metadata categories. Creating a new metadata field may include naming the metadata field and specifying a type of data for the metadata field (e.g., string, number, date, true/false). The administrator may be permitted to associate an existing metadata category with the location and/or create a new metadata category. If a new metadata category is created, this metadata category may be available for the administrator and/or administrators to associate with other locations. Specified individual metadata fields and/or metadata categories may be applied to sub-locations (e.g., subfolders) of the CMS. Whether application of the individual metadata fields and/or metadata categories occurs to sub-locations may be specified by the administrator. Metadata/category setting storage database 146 may be updated to indicate the individual metadata fields and/or metadata categories specified by the administrator.

Figure 1B:
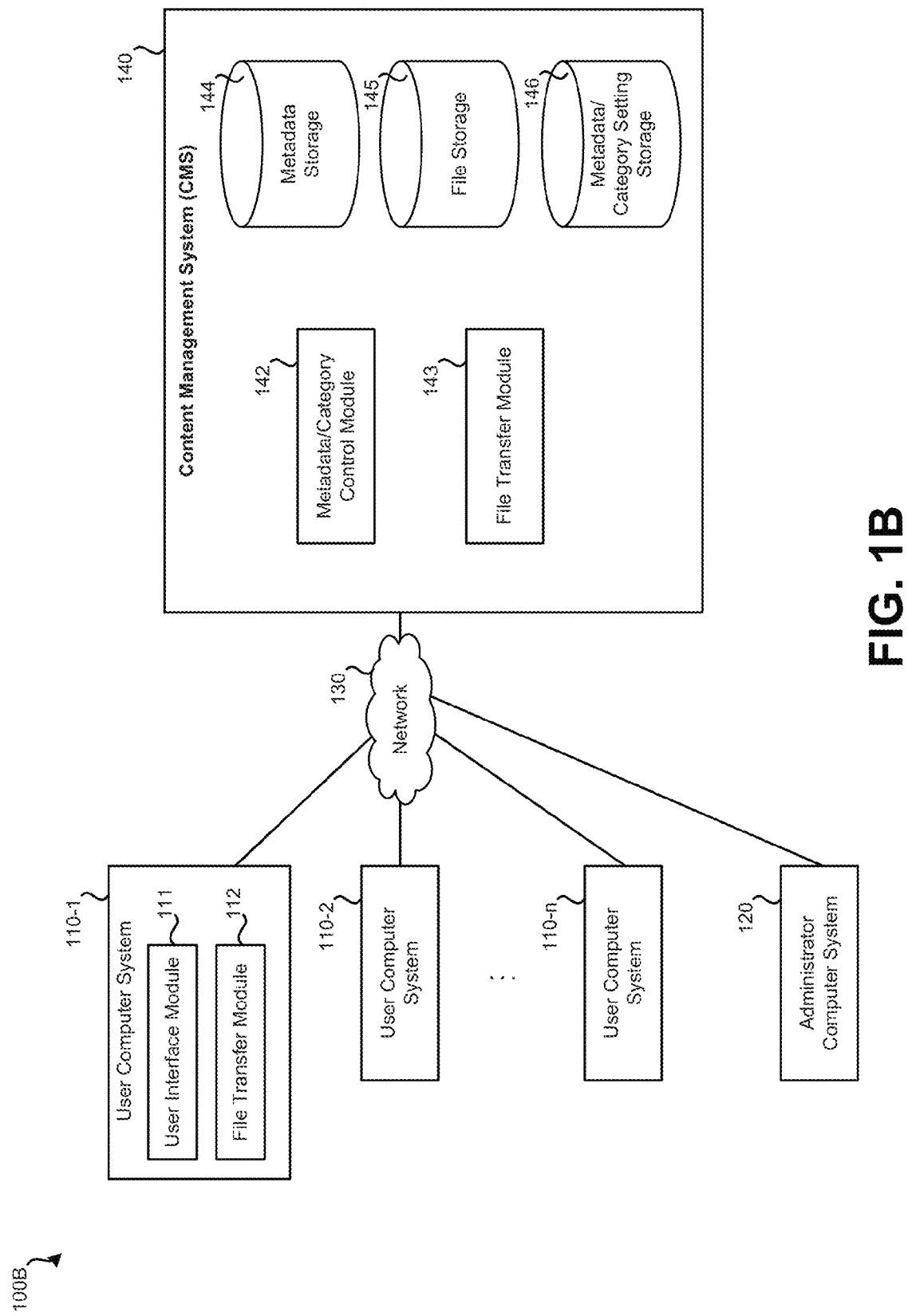
FIG. 1B illustrates another embodiment of a system configured to apply metadata to multiple files managed by a content management system.

FIG. 1B illustrates an embodiment of a system 100B configured to apply metadata to multiple files managed by a content management system. System 100B may have components similar to system 100A. In system 100B, functionality of some modules may be handled by user computer systems 110 rather than CMS 140. Similar to system 100A, system 100B may include user computer systems 110, administrator computer system 120, network 130, and content management system (CMS) 140. In system 100B CMS 140 may include: metadata/category control module 142, file transfer module 143, metadata storage database 144, file storage database 145, and metadata/category setting storage database 146. In system 100B, each user computer system of user computer systems 110 may include a user interface module 111 and file transfer module 112.

User interface module 111 may be executed local to user computer system 110-1 and may cause a user interface to be rendered by the user computer system to the user. The user interface may request the necessary (and/or optional) metadata values be provided for the metadata fields. Metadata/category control module 142 may provide, upon request, an indication of the metadata fields required for a location at CMS 140. The user interface created by user interface module 111 may allow the user to specify individual metadata values for each file being uploaded for management to CMS 140. The user interface may provide the user with an apply-to-all option that, when activated, applies the input metadata values to all files uploaded by the user to the location. The metadata values submitted by the user may be: 1) associated with the one or more files and stored in metadata storage 144; and 2) if the apply-to-all option is activated, stored by the user's user computer system and/or CMS 140 in case the user uploads additional files to the same location, in which case the metadata values would also be applied to these files. When a metadata field is associated with an activated apply-to-all option, the value of the metadata field may be stored locally to user computer system 110-1 for application to other files uploaded to the corresponding location at CMS 140.

User interface module 111 may be configured to cause multiple different user interfaces to be presented to the user uploading the one or more files for management. FIGS. 2 through 6 illustrate various embodiments of user interfaces that user interface module 111 may cause to be presented. File transfer module 112 of user computer system 110-1 may control and manage transfer of files from user computer system 110-1 to content management system 140. It should be understood that other user computer systems of user computer systems 110 may have similar modules to user computer system 110-1. Other components of system 100B may be as described in relation to system 100A.

Figure 2:
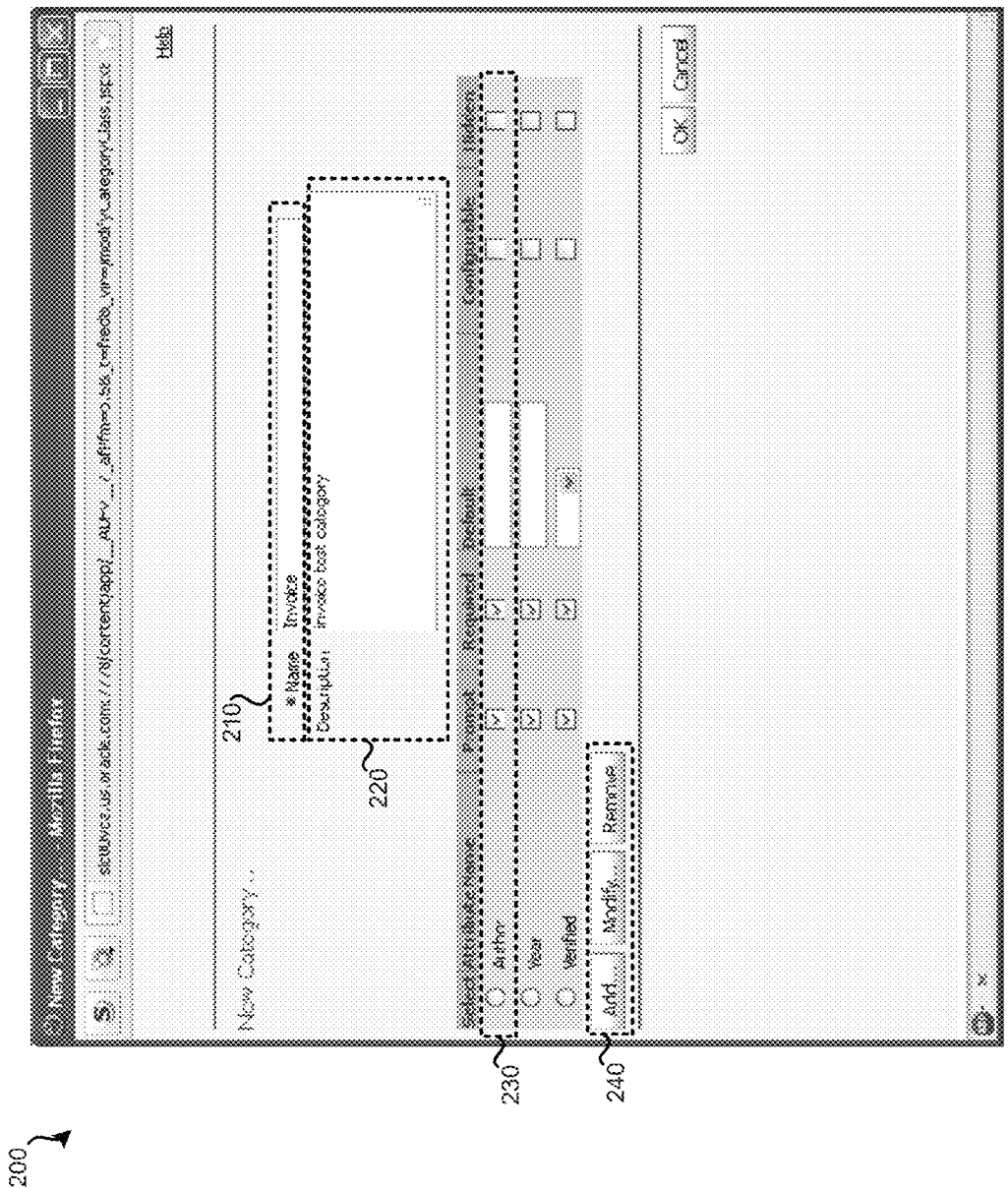
FIG. 2 illustrates an embodiment of a user interface for creating a metadata category for a content management system.

FIG. 2 illustrates an embodiment of a user interface 200 for creating a metadata category for a content management system. As previously discussed, a metadata category may indicate one or more metadata fields (also referred to as attributes). A metadata category may be linked by an administrator of the CMS with one or more locations. As such, by linking a location to a metadata category, one or more metadata fields may be made required for the location. User interface 200 may be presented to an administrator. Referring to FIG. 1, user interface module 141 of CMS 140 may present the user interface to the user or administrator via network 130 and a remote computer system (e.g., administrator computer system 120). As detailed above, an administrator, via a remote computer system or directly via CMS 140, may be permitted to create or modify a metadata category.

User interface 200 illustrates the creation of an exemplary metadata category. Such a metadata category may be associated by administrator with one or more storage locations of a CMS, such as CMS 140 of FIG. 1. Name field 210 may permit the administrator to specify the name of the metadata category, in this example the name is "Invoice." Description field 220 may permit the user to specify a description of the metadata category. In the illustrated embodiment, three metadata fields are part of the metadata category: "author," "year," and "verified." The use of three metadata fields is for example purposes only, a metadata category may include a fewer or a greater number of metadata fields. Metadata field 230 indicates the "author" metadata field that was created as part of the invoice metadata category.

Properties that may be specified for a particular metadata field include: prompt, required, default, configurable, and hidden. Fewer or additional properties may be present in other embodiments. The "prompt" property may be used to enable whether a user is prompted to provide a metadata value for the metadata field upon upload of a file to a location associated with the metadata category. The "required" property may be used to enable whether a user is required to provide a metadata value for the metadata field (or providing a metadata value is optional). The "default" property may specify a default value for the metadata field. The "configurable" property may be used to enable whether a user is allowed to modify the value of the metadata field in case a default value is provided. The "hidden" property may be used to enable whether the value of this metadata field is viewable by users that view the metadata values of a file associated with the metadata category. User interface buttons 240 may permit an administrator to: 1) add additional metadata fields (also referred to as attributes, as illustrated) to a metadata category; 2) modify existing metadata fields of the metadata category; and 3) remove a metadata field from the metadata category.

It should be understood that user interface 200 may include more, fewer, or different options for creating and/or modifying a metadata category. Further, in other embodiments, the visual presentation of user interface 200 may be rearranged or modified while maintaining the same or similar functionality. As such, the illustrated embodiment of user interface 200 does not limit the visual appearance of other embodiments of such a user interface.

Figure 3:
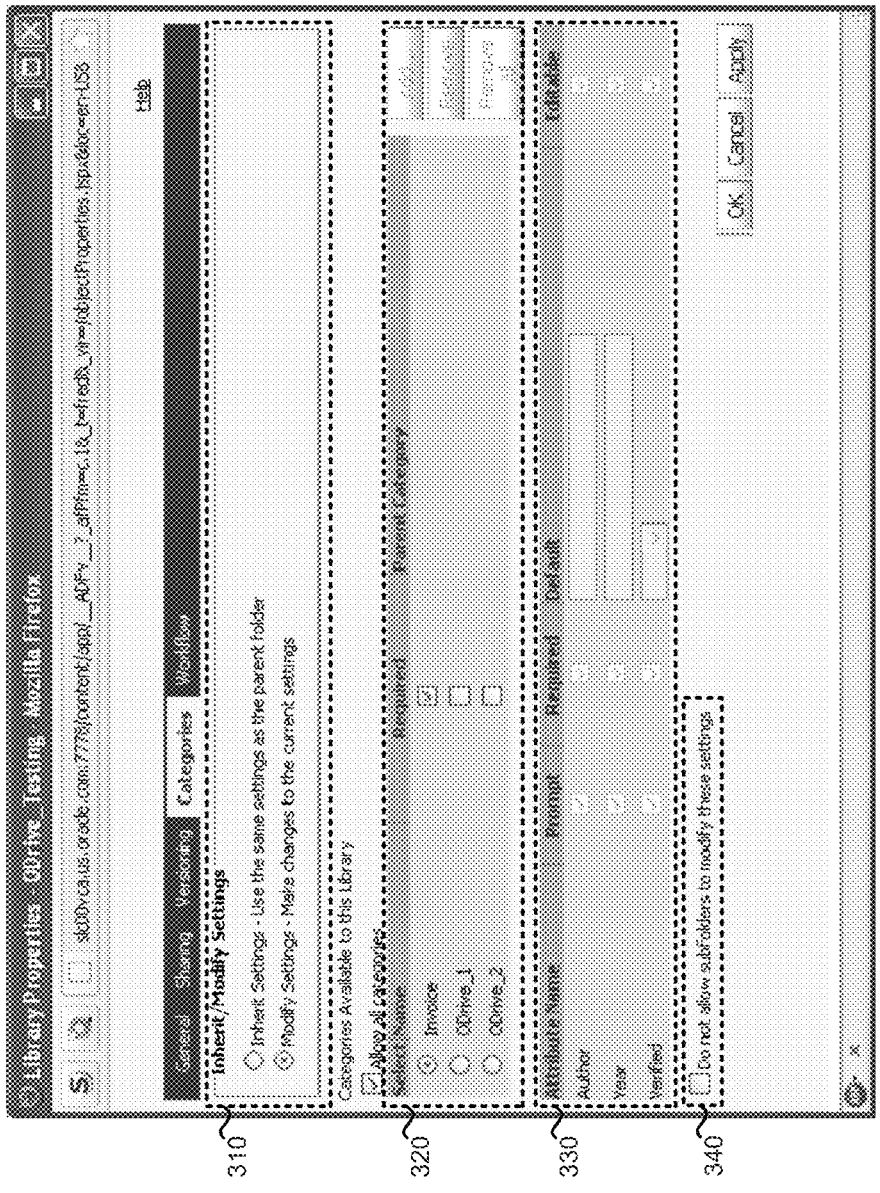
FIG. 3 illustrates an embodiment of a user interface for applying a metadata category to a location managed by a content management system.

FIG. 3 illustrates an embodiment of user interface 300 for applying a metadata category to a location managed by a content management system. User interface 300 may be presented to an administrator. Referring to FIG. 1, user interface module 141 of CMS 140 may present the user interface to the administrator via network 130 and a remote computer system (e.g., administrator computer system 120). As detailed above, an administrator, via a remote computer system or directly via CMS 140, may be permitted to create or modify a metadata category. Once created or modified, a metadata category may be applied to one or more locations of a content management system.

User interface 300 may be used by an administrator to apply a previously created and/or modified metadata category to a location, such as a folder, of a content management system. For instance, another administrator may have used user interface 200 of FIG. 2 to create a metadata category and then may use user interface 300 of FIG. 3 to apply the created metadata category to one or more locations.

Settings field 310 may permit a user to indicate whether a parent location, such as a parent folder, should be used to determine the metadata (and possibly other settings) for the folder. Settings field 310 may additionally or alternatively permit the administrator to modify the metadata fields and/or metadata categories for the location. Metadata category field 320 may permit an administrator to: 1) select which metadata categories are applied to the location; and/or 2) for which metadata categories, if any, values are required to be provided by the user. It may be possible to select none, one, or more than one metadata category. Attribute field 330 may indicate the one or more metadata fields (also referred to as attribute fields) associated with a selected metadata category. As shown in metadata category field 320, the "invoice" metadata category is selected: each of the metadata fields of attribute field 330 corresponds to this metadata category. Sub-location restriction option 340, when enabled, may prohibit a user from modifying the metadata category (and/or individual metadata field) requirements for the sub-location (e.g., sub-folder). As such, if enabled, sub-location restriction option 340 may force subfolders to have the same metadata fields as the parent folder.

While the illustrated embodiment of FIG. 3 illustrates only metadata categories being associated with a location, it should be understood that individual metadata fields, separate from a metadata category, may be associated with a location in some embodiments. As such, in some embodiments, a user is permitted to create a particular attribute, or metadata field, for the location without use of a metadata category. Creation of the metadata field may occur in a similar matter to the creation of a metadata field for a metadata category, as detailed in relation to user interface 200 of FIG. 2.

It should be understood that user interface 300 may include more, fewer, or different options for assigning metadata categories to a location. Further, in other embodiments, the visual presentation of user interface 300 may be rearranged or modified while maintaining the same or similar functionality. As such, the illustrated embodiment of user interface 300 does not limit the visual appearance of other embodiments of such a user interface.

Figure 4:
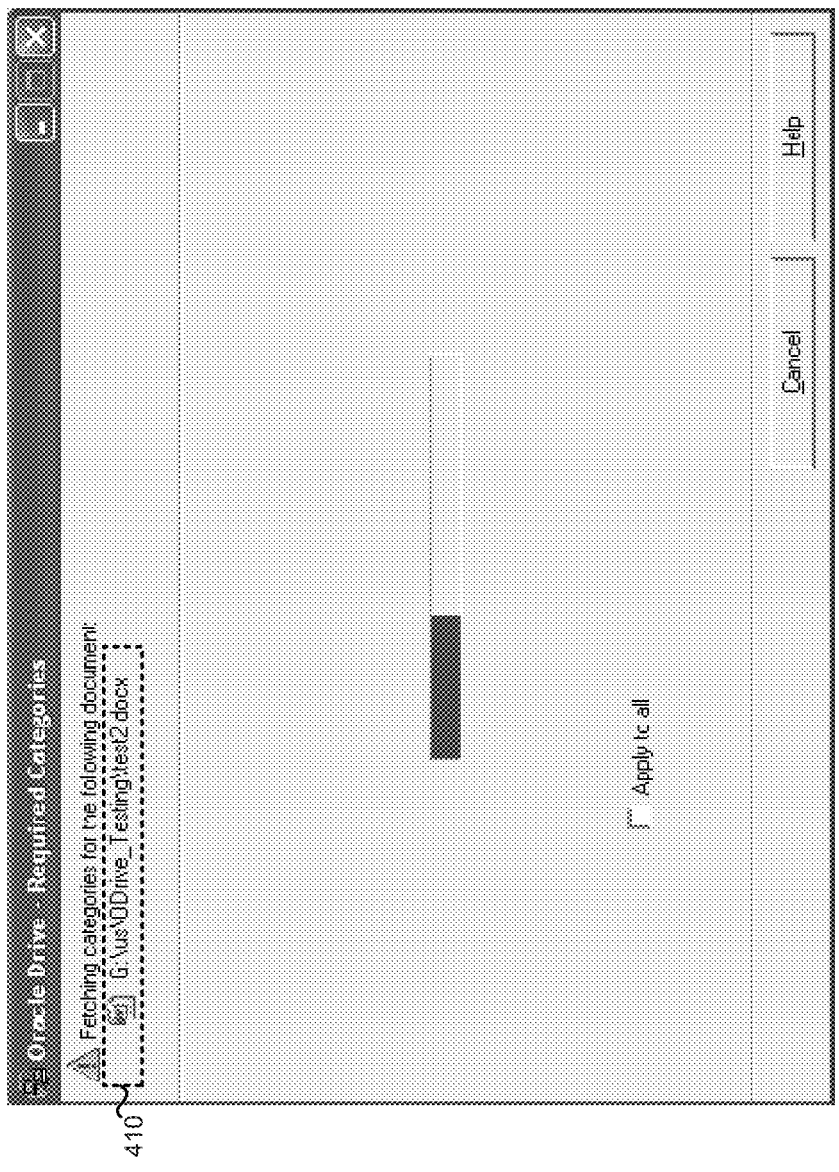
FIG. 4 illustrates an embodiment of a user interface presented while determining if one or more metadata categories are applicable to one or more files provided to a content management system.

FIG. 4 illustrates an embodiment of a user interface 400 presented while determining if one or more metadata categories are applicable to one or more files provided to a content management system. User interface 400 may be presented to a user or administrator. Referring to FIG. 1, user interface module 141 of CMS 140 may present the user interface to the user or administrator via network 130 and a remote computer system (e.g., one of user computer systems 110 or administrator computer system 120). When one or more files are uploaded for management and storage to a content management system, user interface 400 may be displayed while CMS 140 is identifying metadata fields that are required to have values provided by the user.

Referring to FIG. 1, when a user uploads one or more files to a location of CMS 140, metadata/category control module 142 may access metadata/category setting storage database 146 to determine which metadata fields and/or metadata categories are required for each file to be stored in the location. User interface 400 may be presented to the user while this information is being retrieved by CMS 140. As illustrated, when a user uploads file "test2.docx" as indicated by status 410, the individual metadata data fields and/or metadata categories that are required (and/or optional) for the upload location (in this example: "g:\us\ODrive_Testing") may be retrieved.

It should be understood that user interface 400 may be rearranged or modified while maintaining the same or similar functionality. As such, the illustrated embodiment of user interface 400 does not limit the visual appearance of other embodiments of such a user interface.

Figure 5:
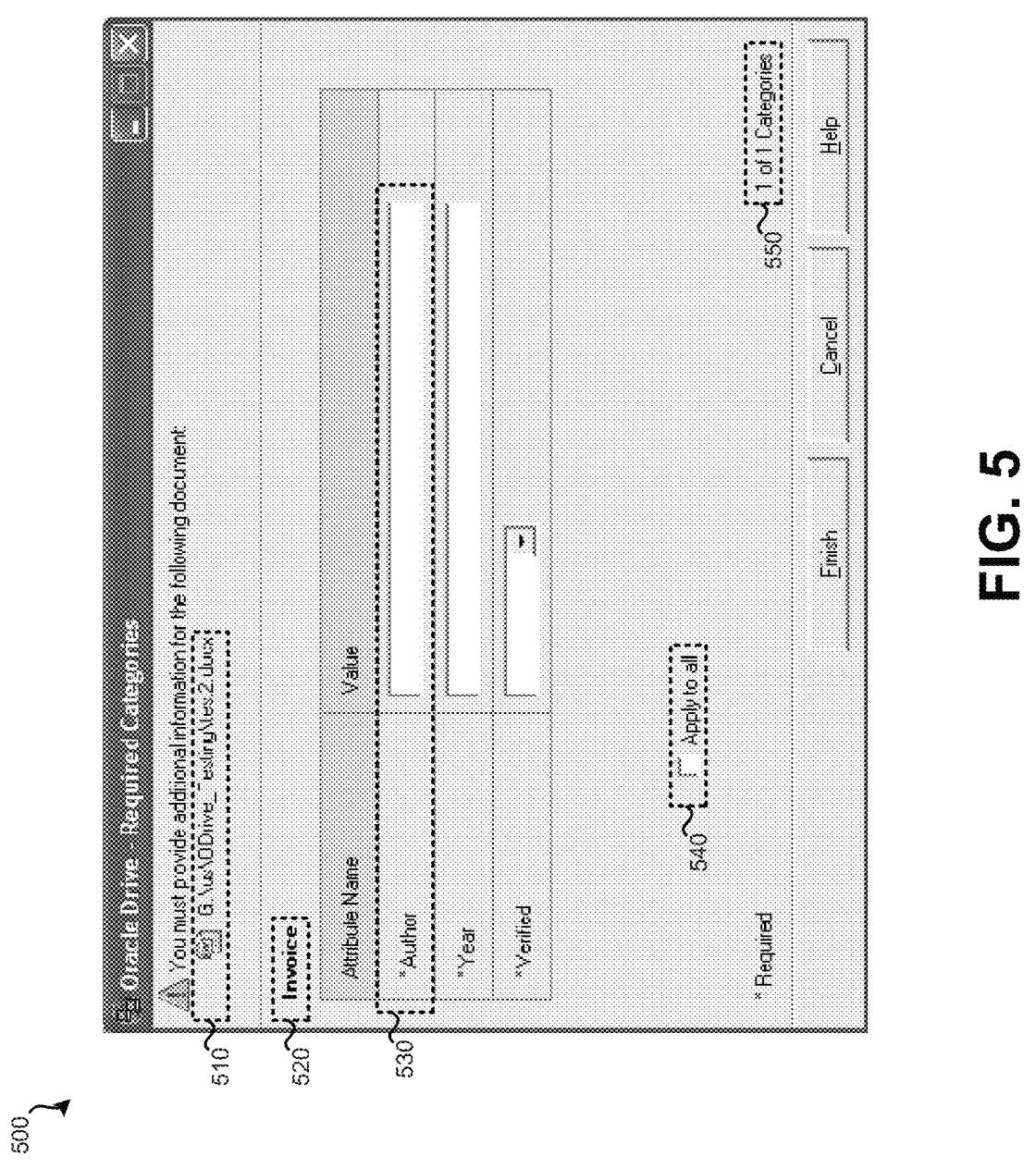

FIG. 5 illustrates an embodiment of a user interface 500 that prompts a user to enter multiple metadata values for a file provided to a content management system for storage and management. User interface 500 may be presented to a user or administrator. Referring to FIG. 1, user interface module 141 of CMS 140 may present user interface 500 to the user or administrator via network 130 and a remote computer system (e.g., one of user computer systems 110 or administrator computer system 120). A user and/or an administrator, via a remote computer system or directly via CMS 140, may use user interface 500 to provide one or more metadata values for one or more metadata fields.

In response to determining that values for metadata fields of a metadata category must be provided by a user, user interface 500 may be presented. As such, user interface 500 may be presented after user interface 400 was presented and the "invoice" metadata category was identified as associated with the location the one or more files are to be saved at the CMS. Status 510 may indicate the file and/or location that the metadata fields requested are related to. Metadata category name 520 may indicate the name of the metadata category of which metadata fields being presented are part of. Metadata field 530 indicates one of the metadata fields of the metadata category indicated by metadata category name 520 of which a metadata value is requested. Metadata field 530 has a name of "author." The user may specify the metadata value. The form in which the user is permitted to input a metadata value may vary according to the type of the metadata field. For instance, the metadata field "verified," may permit only a value of "yes" or "no" to be selected, while the metadata value for "author" may permit a string of characters to be entered by the user.

A user may be permitted to enter separate metadata values for each file being uploaded to a location of a content management system. A user may also be permitted to enable apply-to-all option 540. Apply-to-all option 540 may result in metadata values input by the user into the metadata fields being applied to all files uploaded or otherwise provided to this location by the user. The files that are affected may be the files that are part of the same transfer to the content management system. In some embodiments, the metadata values indicated as to be applied to all may be used for the remainder of the user's currently active session with the CMS. In some embodiments, the metadata values indicated as to be applied to all are used until the user specifically indicates the metadata values are not to be used for uploads to the CMS (e.g., in later sessions). As such, the metadata values and an indication of the location may be stored by the user's computer system and/or the CMS such that the metadata values are available for association with future files uploaded to the same location or a sub-location of the location, such as a subfolder. Category indicator 550 may indicate the number of metadata categories assigned to the location where the file is being uploaded. If an additional category is associated with the location where the file is being uploaded to, in a subsequently displayed user interface, metadata fields of the additional category may be presented such that the user can enter metadata values.

Apply-to-all option 540 may only be for currently displayed metadata fields and/or metadata categories. As such, apply-to-all option 540 may be activated for a particular metadata category (such that metadata values provided by the user are associated with files uploaded or otherwise provided to the location), while other metadata categories (which may also be required to be provided for the location) may not automatically be set to particular metadata values supplied by the user.

It should be understood that user interface 500 may include more, fewer, or different options for assigning metadata values to metadata fields associated with a location. Further, in other embodiments, the visual presentation of user interface 500 may be rearranged or modified while maintaining the same or similar functionality. As such, the illustrated embodiment of user interface 500 does not limit the visual appearance of other embodiments of such a user interface.

Figure 6:
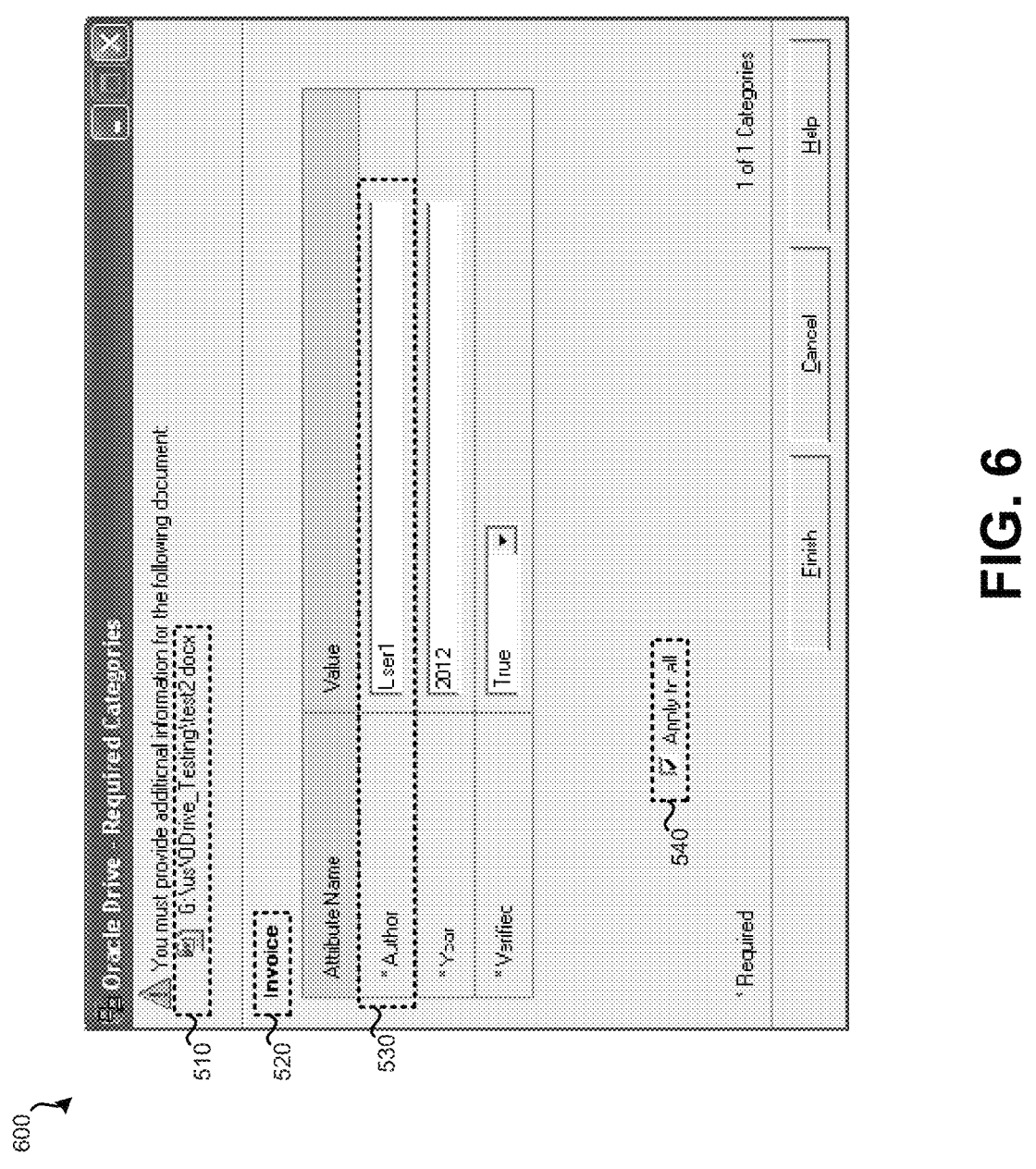

FIG. 6 illustrates an embodiment of user interface 600 which represents user interface 500 of FIG. 5 in which the user has provided multiple metadata values and activated an apply-to-all option. In user interface 600, a user has provided metadata values for metadata fields: "author," "year," and "verified." Further, the user has activated apply-to-all option 540. As such, the metadata values of: "User1," "2012," and "True" will be applied to metadata fields for other files that are uploaded to the same location or a sub-location of the location by the user. As such, if the file transfer contains ten files destined for storage in the location, metadata values may only be provided for the first file and may then be applied to each of the other files. Subsequent uploads of files to the same location (or a sub-location) by the user during the same session with the CMS may also have these metadata values used. In some embodiments, later sessions in which the user uploads files to the same location may also use these metadata values (in such embodiments, a user may need to disable apply-to-all option 540 to prevent the metadata values from being applied to files of a later upload to the same location of the CMS).

Figure 7:
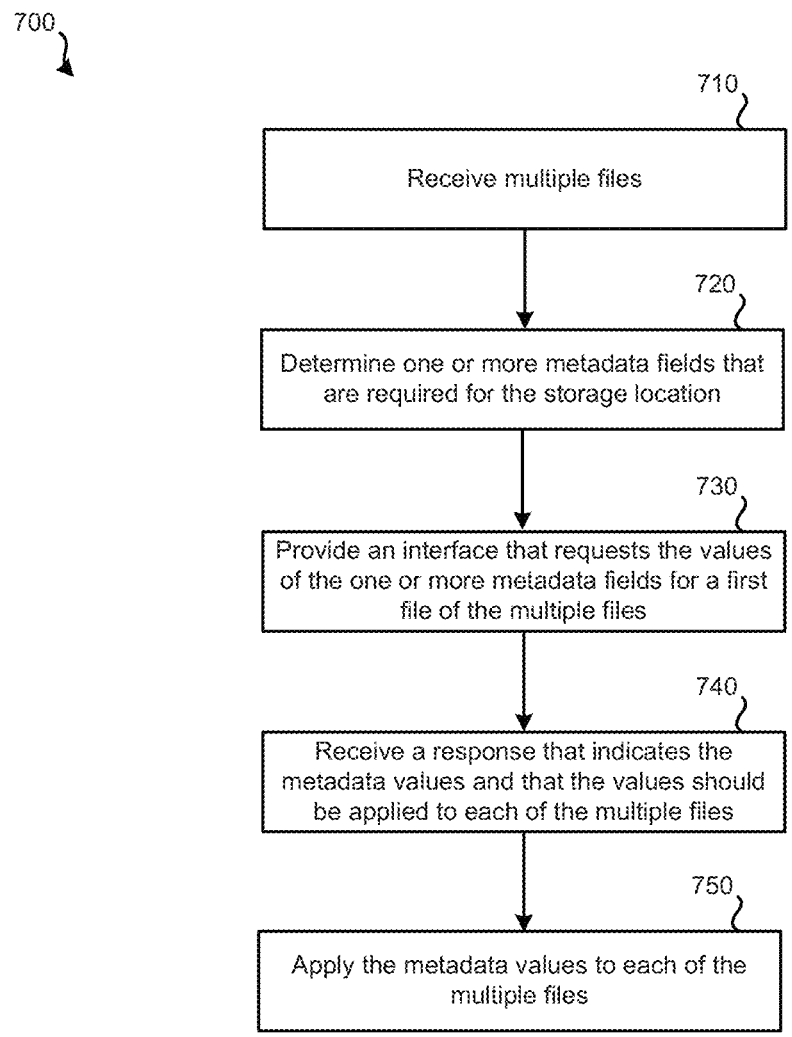
FIG. 7 illustrates an embodiment of a method for applying metadata to multiple files managed by a content management system.

Various methods may be performed using system 100 of FIG. 1 and the user interfaces of FIGS. 2 through 6. FIG. 7 illustrates an embodiment of a method 700 for applying metadata values provided by a user to multiple files managed by a content management system. Method 700 may be performed using system 100A of FIG. 1A, system 100B of FIG. 1B, or some other system configured to permit metadata to be applied to multiple files managed by a CMS. Each step of method 700 may be performed by one or more computer systems, such as a content management system and/or user computer system. Means for performing method 700 include computerized devices, and, more specifically, a content management system.

At step 710, an indication of multiple files being provided to a content management system may be received by the user computer system and/or the content management system. In some embodiments, the files may begin to be transmitted to the CMS at step 710. In other embodiments, metadata values must first be successfully provided by the user before transfer to the CMS from the user computer system of the files begins. Referring to system 100A, such an indication of multiple files may be received by user interface module 141. Referring to system 100B, such an indication may be received user interface module 111. The indication of the multiple files may indicate a location at the CMS where the multiple files are to be stored. In some embodiments, locations of the CMS can be navigated by a user via a folder structure. As such, a user may be able to navigate among folders of the CMS using a graphical user interface. Once the user has navigated to the location of the CMS where the multiple files are to be stored, the user may provide input that indicates the files are to be moved, copied, or otherwise provided to that location of the CMS. For instance, the user may drag and drop the files into the folder (or other type of location) of the CMS. In some embodiments, a copy and paste or cut and paste input may be used to copy or move the files to the location of the CMS. At step 710, the files may be copied or moved to the CMS. In some embodiments, the files may be copied or moved to the CMS after metadata values for each file have been received or while metadata values are being received from the user.

Referring to system 100A of FIG. 1A, a user may upload (e.g., copy, move, or otherwise provide) the files to be stored and managed by the CMS from a user computer system of user computer systems 110. The files may be transmitted to CMS 140 via network 130.

At step 720, the CMS may inspect the properties for the location where the files are to be stored. This may involve identifying one or more individual metadata fields and/or one or more metadata categories that are required or are optional for files stored in the location. The same or a different user or administrator may previously have configured the CMS to require such metadata fields and/or metadata categories for files loaded to the location. If the location (e.g., folder) is a sub-location (e.g., subfolder) of a parent location (e.g., a parent folder), the metadata requirements of the sub-location may be the same as the parent location. Referring to system 100A, metadata/category control module 142 may inspect metadata/category setting storage database 146 to determine which individual metadata fields (specific to the location) and/or metadata categories are required for the location where the files are to be stored at the CMS. Indications of the one or more metadata fields and/or or more metadata categories that are required or are optional for the location may be provided by the CMS to the user computer system.

At step 730, a user interface may be provided to the user via a user computer system. The user interface may request one or more metadata values for metadata fields that are required (or that are optional) for files to be stored at the location of the CMS. The metadata fields may include individual metadata fields specific to the location and/or one or more metadata fields of one or more metadata categories. The user interface may be presented to the user via a user computer system being operated by the user. As such, an indication of the required metadata fields may be transmitted by the CMS to the user computer system. The user interface may indicate the names of the various metadata fields that are required (and/or are optional). An input region for the user to input a value for each metadata field may be provided. The input region may restrict the user input to a type of information, such as a string of characters or selection of yes or no, based on the type of metadata field. The user may also be presented with an apply-to-all option. If activated by the user, the apply-to-all option may apply the user's input metadata values to all metadata fields for the files provided to the CMS by the user for storage at the location. As such, the user may only need to input metadata values to be applied to files provided by the user for the location once.

Referring to FIG. 1, CMS 140 may transfer information to user computer system 110-1 via network 130, wherein the information transmitted is sufficient to cause user computer system 110-1 to present the user interface. The user interface presented to the user may be user interface 500 of FIG. 5 or a similar user interface.

At step 740, after the user has entered metadata values for each of the required metadata fields indicated in the interface of step 730, information may be transmitted to and received by the CMS that indicates the metadata values provided by the user. An indication that the apply-to-all option has been activated may also be received (assuming the user has so activated the option). The indication that the apply-to-all option has been activated may be stored locally by the user computer system. Referring to FIG. 1, CMS 140 may receive the response from a user computer system (such as user computer system 110-1) via network 130. A check may be performed for validity of the metadata values. For example, if a date is provided by the user, the date may be checked to ensure it is in a proper format and occurs in the past.

At step 750, the metadata values received at step 740 may be applied to the metadata fields of each of the files received at step 710 by the user computer system. As such, the user may only need to provide each metadata value once and activate the apply-to-all option. In response, the user computer system may apply the metadata values provided by the user to each of the files, and transmit indications of such metadata values for each file to the CMS. Applying the metadata value to each file may include providing, by the user computer system, an indication of the metadata value to the CMS for each file. This may occur when the CMS requests a metadata value for each file. As such, the metadata value may be associated with each of the files when stored by the CMS. If one or more files are provided to the CMS for storage at another location managed by the CMS, the metadata values provided by the user associated with the apply-to-all option may not be applied by the user computer system to these additional files. As such, the metadata values associated with the apply-to-all option may only apply to the location where the files were provided for storage at the CMS (and, possibly, sub-locations of the location). In some embodiments, an indication of the apply-to-all option being activated may be maintained by the CMS rather than the user computer system. In such embodiments, the CMS may apply the user-provided metadata values to each of the multiple files rather than the user computer system.

Further, either the user computer system of the user or the CMS may store indications of the location and the metadata values associated with the apply-to-all option. If the user later provides one or more additional files to the location of the CMS, the metadata values may be applied to the files without requiring any user action. This may occur if the files are provided to the location during the same session.

Figure 8:
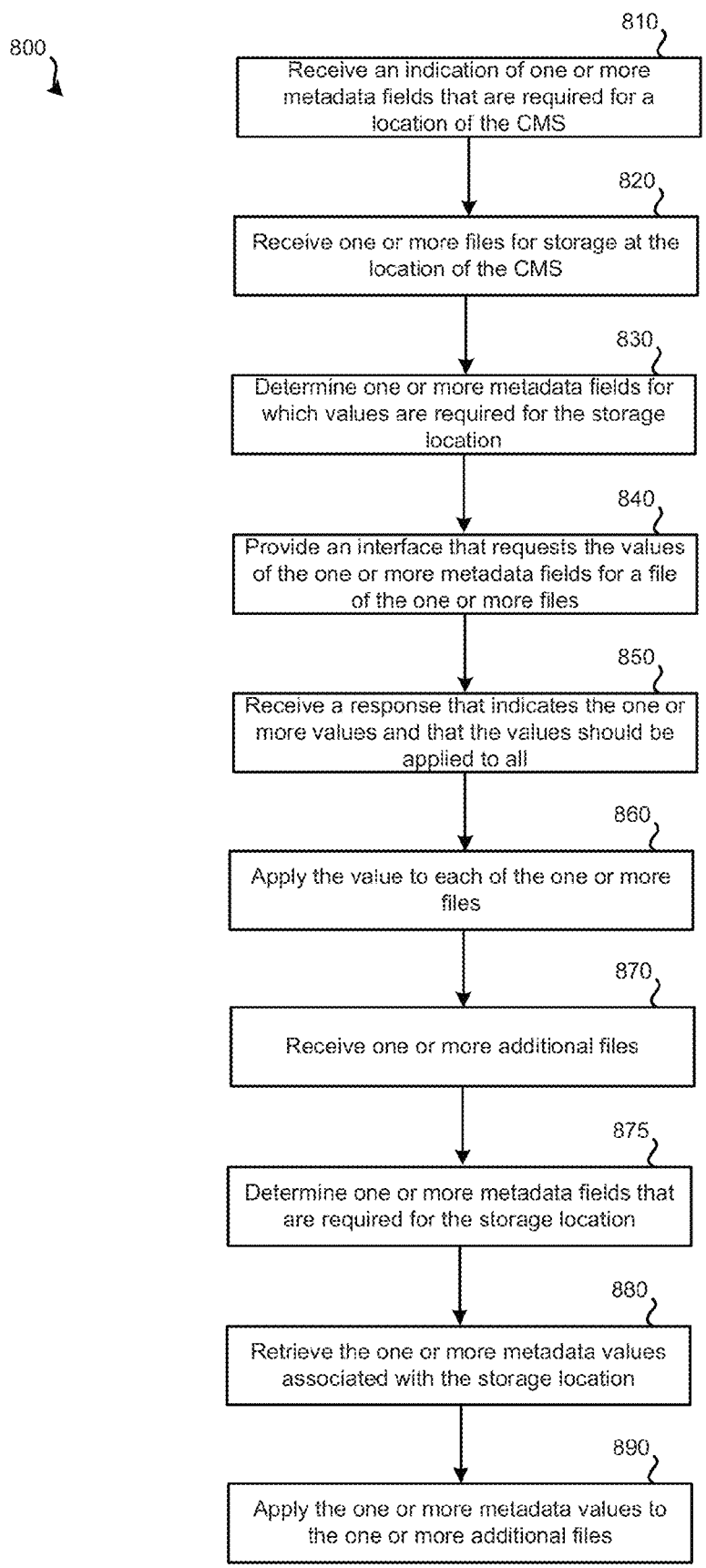
FIG. 8 illustrates another embodiment of a method for applying metadata to multiple files managed by a content management system.

FIG. 8 illustrates another embodiment of a method for applying metadata to multiple files provided to a content management system for storage and management. Method 800 may be performed using system 100A of FIG. 1A, 100B of FIG. 1B, or some other system configured to permit metadata to be applied to multiple files managed by a CMS. Each step of method 800 may be performed by one or more computer systems, such as a content management system and/or user computer system. Means for performing method 800 include computerized devices, and, more specifically, a content management system, network, and user computer system.

At step 810, an indication of one or more metadata fields that are required for files stored in the particular location of a content management system may be received. Step 810 may be initiated by an administrator at some time prior to a user providing files for storage at the particular location of the CMS. The indication may include one or more specific metadata fields and/or one or more predefined metadata categories. Such metadata categories may have been previously created by an administrator, such as via user interface 200 of FIG. 2. Such metadata categories may include one or more metadata fields. Referring to user interface 300 of FIG. 3, a location can be associated with multiple metadata categories. A metadata field may be optional or required. If required, a value may be required to be provided for the metadata field when the file is provided to the CMS for storage at the location. The indication received at step 810 may be received from an administrator computer system. An indication of the required metadata fields may be stored as part of a metadata/category setting storage database of the CMS for later retrieval when a file is provide for storage at the location.

At step 820, a user may attempt to transfer multiple files to the particular storage location of a content management system. Prior to attempting to transfer the multiple files, no indication of a metadata requirement may be provided to the user. At step 820, an indication of one or more files being provided to a content management system may be received by the user computer system and/or the content management system. The indication of the multiple files may indicate the location at the CMS where the multiple files are to be stored. This location may be the location at which metadata fields were specified as required at step 810. In some embodiments, the CMS can be navigated by a user via a folder structure. As such, a user may be able to navigate among folders of the CMS using a graphical user interface. Once the user has navigated to the location of the CMS where the multiple files are to be stored, the user may provide input that indicates the files are to be moved, copied, or otherwise provided to that location of the CMS. At step 820, the files may be copied or moved to the CMS or begin being copied or moved to the CMS. In some embodiments, the files may be copied or moved to the CMS after metadata values for each file have been received or while metadata values are being received from the user.

At step 830, the CMS may inspect the properties for the location where the files are to be stored. This may involve identifying one or more individual metadata fields and/or one or more metadata categories that are required or are optional for files stored in the location. The metadata fields indicated at step 810 may be identified. Indications of the metadata fields indicated at step 810 may be provided to the user computer system by the CMS. The same or a different user or administrator may previously have configured the CMS to require the particular metadata fields and/or metadata categories for files loaded to the location at step 810. If the location (e.g., folder) is a sub-location (e.g., subfolder) of a parent location (e.g., a parent folder), the metadata requirements of the sub-location may be the same as the parent location. Referring to system 100, metadata/category control module 142 may inspect metadata/category setting storage database 146 to determine which individual metadata fields and/or metadata categories are required for the location where the files are to be stored at the CMS.

At step 840, a user interface may be provided to the user, via a user computer system, that provided the files to the CMS. The user interface may request one or more metadata values for the required metadata fields (and/or optional metadata fields) for the one or more files provided for storage at the location of the CMS. The user may receive no prior indication of the metadata requirement before initiating a transfer of the one or more files. The metadata fields may include individual metadata fields specific to the location of the CMS and/or metadata fields of one or more metadata categories associated with the location of the CMS. The user interface may be provided to the user via a user computer system being operated by the user. The user interface may indicate the names of the various metadata fields that are required (and/or are optional). An input region for the user to input a value for each metadata field may be provided. The input region may restrict the user input to a type of information, such as a string of characters or selection of yes or no, based on the metadata field. The user may also be presented with an apply-to-all option. If activated by the user, the apply-to-all option may apply the user's input metadata values to all metadata fields for the files provided to the CMS by the user for storage at the location. As such, the user may only need to input metadata values for the location once, with the same metadata values being applied by the user computer system to all files being provided to the CMS for storage at the location by the user. If the user only provided a single file to the location of the CMS, the apply-to-all option may still be presented. If selected, the user-provided metadata values may be used for future instances of additional files provided by the user to the same location (or a sub-location of the location) of the CMS. An indication of whether or not the apply-to-all option is activated may be stored locally by the user computer system. As such, application of the apply-to-all option to additional files may be performed by the user computer system. From the point-of-view of the CMS, each file received may have its own metadata values provided by the user computer system.

Referring to FIG. 1, CMS 140 may transfer information to user computer system 110-1 via network 130, wherein the information transmitted is sufficient to cause user computer system 110-1 to present the user interface. The user interface presented to the user may be user interface 500 of FIG. 5 or a similar user interface.

At step 850, after the user has entered metadata values for each of the required metadata fields indicated in the interface of step 840, a response may be received by the CMS that indicates the metadata values provided by the user. An indication that the apply-to-all option has been activated may also be received (assuming the user has so activated the option) and stored by the user computer system (and/or the CMS). Referring to FIG. 1, CMS 140 may receive the response including the metadata values from a user computer system (such as user computer system 110-1) via network 130. A check may be performed for validity of the one or more metadata values.

At step 860, the one or more metadata values received at step 850 may be applied to each of the files received at step 820 if there is more than one file. This may involve the user computer system repeatedly providing the same metadata values to the CMS for each of the one or more files. Applying the metadata value to each file may include providing, by the user computer system, an indication of the metadata value to the CMS for each file. This may occur when the CMS requests a metadata value for each file. As such, the metadata value may be associated with each of the files when stored by the CMS. As such, the user may only have needed to provide each metadata value once and activate the apply-to-all option, the user computer system may provide the repeated metadata values to the content management system repeatedly. The CMS may apply and store the metadata values provided by the user to each of the files received at step 820. Further, the user computer system of the user and/or the CMS may store indications of the location and the metadata values associated with the apply-to-all option. If the user later provides (e.g., uploads) one or more additional files to the same location of the CMS, the metadata values may be applied to the files without requiring any user action for the metadata. This may occur if the files are provided to the location during the same user session or within some predefined period of time (e.g., an hour, a day, a week, etc.) or until the user deactivated the apply-to-all option. If the apply-to-all indication is stored by the user computer system, the user computer system may also store indications of the previously provided metadata values. When an additional file is uploaded to the same location, the user computer system may provide the CMS these metadata values without requiring additional input from the user.

At step 870, the user may provide (e.g., upload) one or more additional files to the same location managed by the CMS. This may occur during the same session with the CMS or at some later time. For instance, the additional one or more files may be provided to the CMS after one or more transfers of files have been performed to other locations of the CMS. Step 870 may be similar to step 820. Step 875 may be performed similarly to step 830. At step 880, the one or more metadata values previously associated with the activated apply-to-all option may be retrieved (either by the CMS or by the user's computer system). At step 890, the one or more metadata values received at step 850 may be applied to each of the additional files received at step 870. Applying the metadata value to each file may include providing, by the user computer system, an indication of the metadata value to the CMS for each file. This may occur when the CMS requests a metadata value for each file. As such, the metadata value may be associated with each of the files when stored by the CMS. If the activated apply-to-all option is stored by the user computer system, the user computer system may provide the CMS with the metadata values without requiring the user to provide additional input. As such, the user may only have needed to provide each metadata value once and activate the apply-to-all option in response to the user interface of step 840. Therefore, following the user providing the one or more additional files to the CMS, the user may not be prompted for the metadata values for the one or more additional files.

Figure 9:
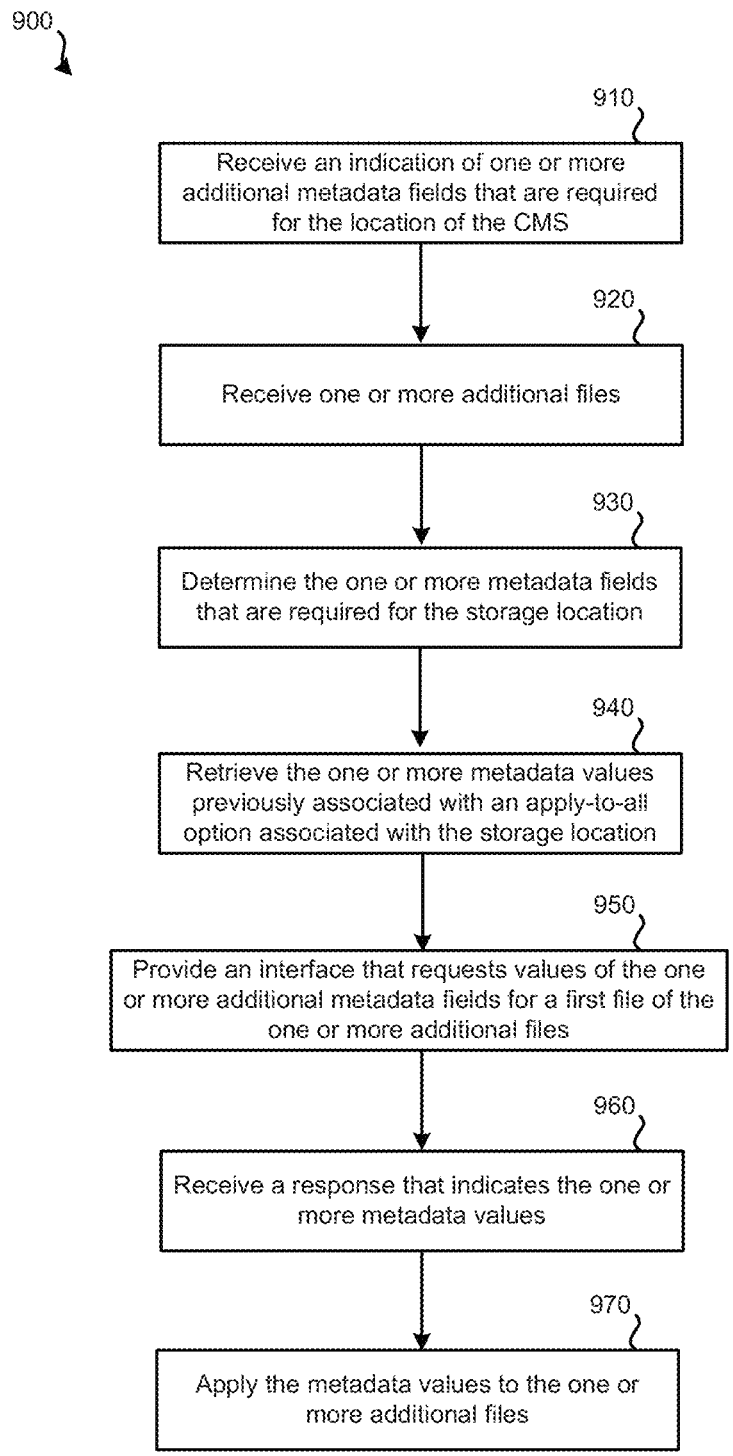
FIG. 9 illustrates yet another embodiment of a method for applying metadata to multiple files managed by a content management system.

FIG. 9 illustrates yet another embodiment of a method for applying metadata to multiple files managed by a content management system. Method 900 may be performed using system 100A of FIG. 1A, system 100B, of FIG. 1B, or some other system configured to permit metadata to be applied to multiple files managed by a CMS. Each step of method 900 may be performed by one or more computer systems, such as a content management system and user computer system. Means for performing method 900 include computerized devices, and, more specifically, a content management system, a user computer system, and a network. Method 900 may be performed following method 700, method 800, or some other method that results in metadata values being indicated by a user as applicable to all files provided to a particular location of a CMS.

At step 910, after method 700, method 800, or some other method that results in an administrator specifying metadata values and activating an apply-to-all option has been performed, the same administrator or a different administrator may specify one or more additional individual metadata fields and/or metadata categories that are required for the location. The indication received at step 910 may be received from an administrator computer system. An indication of the required metadata fields may be stored as part of a metadata/category setting storage database of the CMS for later retrieval when a file is provided for storage at the location of the CMS.

At step 920, the user may provide (e.g., upload) one or more additional files to the same location managed by the CMS. The user may have already provided metadata values and activated an apply-to-all option for this location; however, following the metadata values being provided, indications of the additional metadata fields of step 910 were received. This may occur during the same session or at some later time. For instance, the additional one or more files may be provided to the CMS after one or more transfers of files have been performed to other locations of the CMS.

At step 930, the CMS may inspect the properties for the location where the files are to be stored. This may involve identifying one or more individual metadata fields and/or one or more metadata categories that are required or are optional for files stored in the location. In method 900, this may involve identifying the metadata fields that the user has previous entered values for and has activated an apply-to-all option and also the metadata fields that were set as required for the location after the user previously provided files to the location. As such, the apply-to-all option may only be active for some of the required metadata fields.

At step 940, the one or more metadata values previously associated with the apply-to-all option for the location may be retrieved (either by the CMS or by the user's computer system). These metadata values may have been provided when method 700 or method 800 was performed. If the activated reply-to-all option is stored by the user computer system, the associated metadata values may be provided by the user computer system to the CMS to be associated with the one or more additional files.

At step 950, a user interface may be provided to the user. At step 950, the user may only be prompted for metadata values that the user has not previously activated an apply-to-all option for. As such, only the metadata fields received at step 910 may be prompted for by the interface. The user interface may request one or more metadata values for the metadata fields required (or are optional) for files stored at the location of the CMS that was indicated at step 910. The metadata fields may include individual metadata fields specific to the location and/or metadata fields of one or more metadata categories. The user interface may be provided to the user by the CMS via a user computer system being operated by the user. The user interface may indicate the names of the various metadata fields that are required (and/or are optional). An input region for the user to input a value for each metadata field may be provided. The input region may restrict the user input to a type of information, such as a string of characters or selection of yes or no, based on the metadata field. The user may also be presented with an apply-to-all option. If activated by the user, the apply-to-all option may apply the user's input metadata values to all metadata fields for the files provided to the CMS by the user for storage at the location. As such, the user may only need to input metadata values for the location once, with the same metadata values being applied (by the user computer system or the CMS) to all files provided to the CMS for storage at the location by the user.

At step 960, after the user has entered metadata values for each of the required metadata fields indicated in the interface of step 950, a response may be received by the CMS that indicates the metadata values provided by the user. An indication that the apply-to-all option has been activated may also be received (assuming the user has so activated the option) and/or may be stored by the user computer system, with an indication of the associated metadata values. Referring to FIG. 1, CMS 140 may receive the response from a user computer system (such as user computer system 110-1) via network 130. A check may be performed for validity of these new metadata values.

At step 970, the metadata values received at step 960 and the metadata values previously associated with the apply-to-all option may be applied to each of the files received at step 920 by the user computer system or the CMS. Applying the metadata value to each file may include providing, by the user computer system, an indication of the metadata value to the CMS for each file. This may occur when the CMS requests a metadata value for each file. As such, the metadata value may be associated with each of the files when stored by the CMS. Therefore, in method 900 the user is only prompted to input metadata values for the files to be stored at the location for which the user has not previously associated with an active apply-to-all option. The user computer system may apply the metadata values provided by the user to metadata fields for each of the files and transmit the metadata values to the CMS.

Figure 10:
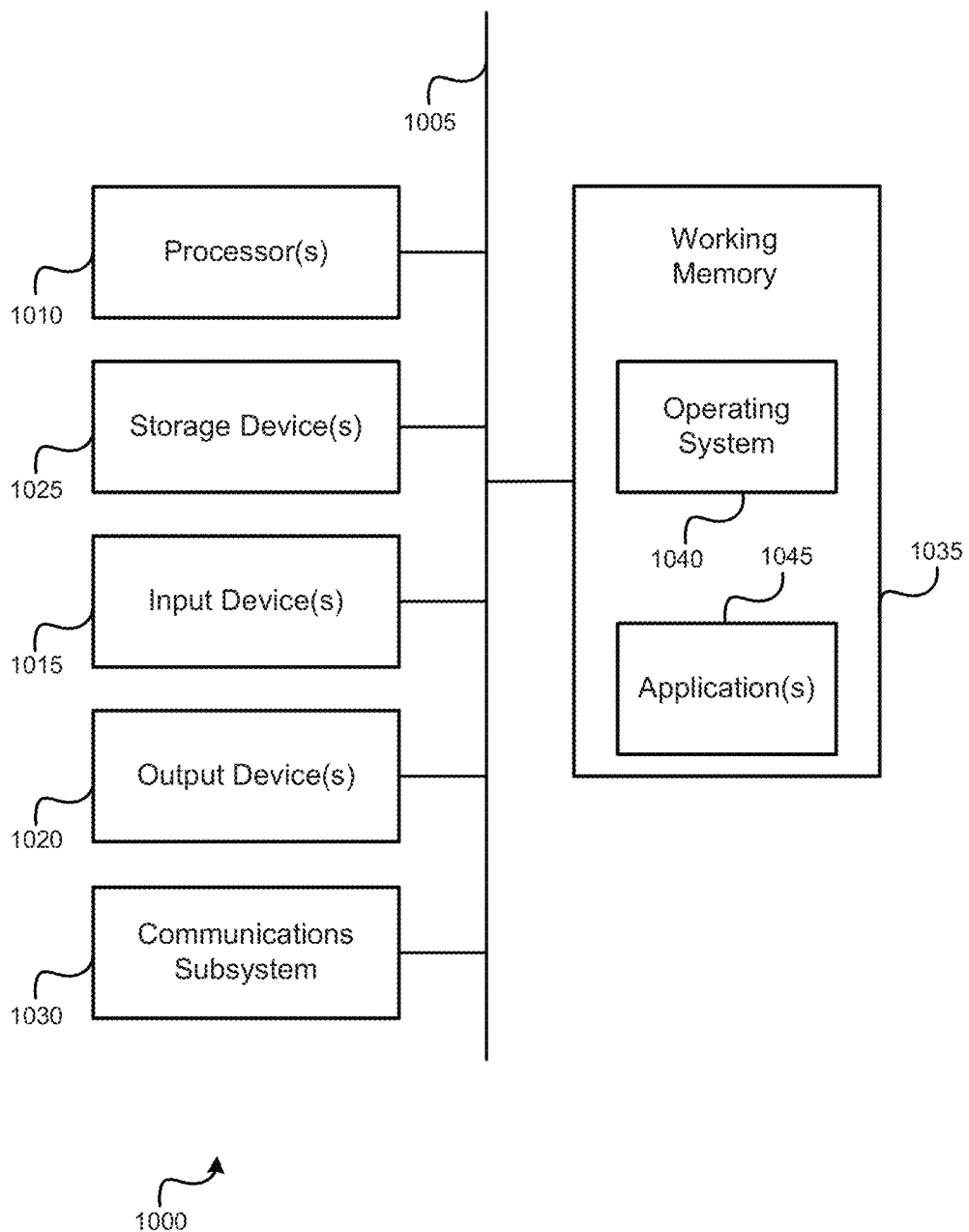
FIG. 10 illustrates an embodiment of a computer system.

FIG. 10 illustrates an embodiment of a computer system. A computer system as illustrated in FIG. 10 may incorporate as part of the previously described computerized devices. For example, computer system 1000 can represent some of the components of the user computer systems, administrator computer systems and/or the content management systems discussed in this application. FIG. 10 provides a schematic illustration of one embodiment of a computer system 1000 that can perform the methods provided by various embodiments, as described herein. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for applying metadata to multiple files managed by a content management system, the method comprising:
   receiving, by a user computer system, an indication of a plurality of files for uploading from the user computer system to the content management system and an indication of a location managed by the content management system where the plurality of files is to be stored;
   receiving, by the user computer system, an indication of a metadata field required for each file of the plurality of files, wherein the metadata field is required based on the location where the plurality of files is to be stored;
   providing, by the user computer system, an interface that requests a value for the metadata field for a first file of the plurality of files to be uploaded to the content management system, wherein:
      the interface provides an apply-to-all option for the value of the metadata field to be applied to each file of the plurality of files; and
   providing, by the user computer system, the value of the metadata field for each file of the plurality of files to the content management system, wherein:
      the user computer system provides the value in response to a separate metadata request received from the content management system for each file of the plurality of files; and
      the content management system is distinct from the user computer system.

2. The method for applying metadata to multiple files managed by the content management system of claim 1, wherein providing the interface that requests the value of the metadata field for the first file of the plurality of files for uploading to the content management system occurs in response to the content management system determining the value for the metadata field is required to be provided.

3. The method for applying metadata to multiple files managed by the content management system of claim 1, further comprising:
   prior to receiving the plurality of files, receiving, by the content management system, an indication of the metadata field from an administrator, wherein:
      the indication specifies the metadata field is required to be provided for files to be stored in the location of the content management system.

4. The method for applying metadata to multiple files managed by the content management system of claim 3, wherein:
   the indication comprises a selection of a metadata category, the metadata category specifies a plurality of metadata fields, and
   at least some metadata fields of the plurality of metadata fields are specified as mandatory.

5. The method for applying metadata to multiple files managed by the content management system of claim 3, further comprising:
   after providing, by the user computer system, the value of the metadata field supplied by a user for each file of the plurality of files to the content management system, receiving, by the user computer system, an indication of a second file for uploading to be stored in the location by the content management system, wherein:
      the second file is not part of the plurality of files;
   determining, by the user computer system, the apply-to-all option was activated in relation to the plurality of files; and
   providing, by the user computer system, the value of the metadata field for the second file to the content management system.

6. The method for applying metadata to multiple files managed by the content management system of claim 3, further comprising:
   after providing the value of the metadata field for each file of the plurality of files to the content management system, receiving, by the content management system, a second indication of a second metadata field, wherein:
      the indication specifies the second metadata field is required for files uploaded to the location of the content management system;
   after providing the value of the metadata field supplied by a user for each file of the plurality of files to the content management system, receiving, by the user computer system, an indication of a second file to be stored in the location by the content management system, wherein:
      the second file is not part of the plurality of files;
   determining, by the user computer system, the apply-to-all option was activated in relation to the plurality of files;
   providing, by the user computer system, the value of the metadata field for the second file to the content management system; and
   providing, by the user computer system, a second interface that requests a second value of the second metadata field for the second file to be uploaded for storage and management to the content management system.

7. The method for applying metadata to multiple files managed by the content management system of claim 1, further comprising:
   receiving, by the content management system, from the user computer system, the value for the metadata field.

8. The method for applying metadata to multiple files managed by the content management system of claim 1, wherein the location is a folder managed by the content management system.

9. A computer program product residing on a non-transitory processor-readable medium for applying metadata to multiple files managed by a content management system, the computer program product comprising processor-readable instructions configured to cause a processor to:
   receive an indication of a plurality of files for uploading to the content management system and an indication of a location managed by the content management system where the plurality of files is to be stored;
   receive an indication of a metadata field required for files to be stored in the location, wherein the metadata field is required based on the location where the plurality of files is to be stored;
   provide an interface that requests a value of the metadata field for a first file of the plurality of files to be uploaded to the content management system, wherein:

the interface provides an apply-to-all option for the value of the metadata field to be applied to each file of the plurality of files; and provide the value of the metadata field for each file of the plurality of files to the content management system, wherein:

the value is provided in response to a separate metadata request received from the content management system for each file of the plurality of files; and the content management system is distinct from a user computer system comprising the processor.

10. The computer program product for applying metadata to multiple files managed by the content management system of claim 9, wherein the processor-readable instructions are further configured to cause the processor to:

after providing the value of the metadata field supplied by a user for each file of the plurality of files to the content management system, receive an indication of a second file for uploading to be stored in the location by the content management system, wherein:

the second file is not part of the plurality of files;

determine the apply-to-all option was activated in relation to the plurality of files; and provide the value of the metadata field for the second file to the content management system.

11. The computer program product for applying metadata to multiple files managed by the content management system of claim 10, wherein the processor-readable instructions are further configured to cause the processor to:

after providing the value of the metadata field supplied by the user for each file of the plurality of files to the content management system, receive an indication of the second file to be stored in the location by the content management system, wherein:

the second file is not part of the plurality of files;

determine the apply-to-all option was activated in relation to the plurality of files;

provide the value of the metadata field for the second file to the content management system; and provide a second interface that requests a second value of a second metadata field for the second file to be uploaded for storage and management to the content management system.

12. The computer program product for applying metadata to multiple files managed by the content management system of claim 9, wherein the location is a folder managed by the content management system.

13. A system for applying metadata to multiple files, the system comprising:

a user computer system; and a content management system communicatively coupled with the user computer system; wherein:

the user computer system is configured to execute processor-readable instructions configured to cause a processor of the user computer system to:

receive an indication of a plurality of files for uploading from the user computer system for storage and management to the content management system and an indication of a location managed by the content management system where the plurality of files is to be stored;

receive an indication of a metadata field required for each file of the plurality of files from the content management system, wherein the metadata field is required based on the location where the plurality of files is to be stored;

provide an interface that requests a value of the metadata field for a first file of the plurality of files to be uploaded for storage and management to the content management system, wherein:

the interface provides an apply-to-all option for the value of the metadata field to be applied to each file of the plurality of files; and provide the value of the metadata field for each file of the plurality of files to the content management system, wherein:

the user computer system provides the value in response to a separate metadata request received from the content management system for each file of the plurality of files; and the content management system is distinct from the user computer system.

14. The system for applying metadata to multiple files managed by the content management system of claim 13, wherein the processor-readable instructions configured to cause the processor of the user computer system to provide the interface that requests the value of the metadata field for the first file of the plurality of files occurs in response to receiving an indication from the content management system that the value for the metadata field is required to be provided.

15. The system for applying metadata to multiple files managed by the content management system of claim 13, wherein the content management system is configured to execute processor-readable instructions configured to cause a processor of the content management system to:

prior to receiving the plurality of files, receive an indication of the metadata field from an administrator, wherein:

the indication specifies the metadata field is required to be provided for files to be stored in the location of the content management system.

16. The system for applying metadata to multiple files managed by the content management system of claim 15, wherein:

the indication comprises a selection of a metadata category, the metadata category specifies a plurality of metadata fields, and at least some metadata fields of the plurality of metadata fields are specified as mandatory.

17. The system for applying metadata to multiple files managed by the content management system of claim 15, wherein the user computer system is further configured to execute processor-readable instruction configured to cause the processor of the user computer system to:

after providing the value of the metadata field supplied by a user for each file of the plurality of files to the content management system, receive an indication of a second file for uploading to be stored in the location by the content management system, wherein:

the second file is not part of the plurality of files;

determine the apply-to-all option was activated in relation to the plurality of files; and provide the value of the metadata field for the second file to the content management system.

18. The system for applying metadata to multiple files managed by the content management system of claim 15, wherein:

the content management system is further configured to execute processor-readable instructions configured to cause the processor of the content management system to:

receive a second indication of a second metadata field, wherein:

the indication specifies the second metadata field is required to be provided for files uploaded to the location of the content management system;

the user computer system is further configured to execute processor-readable instructions configured to cause the processor of the user computer system to:

after providing the value of the metadata field supplied by a user for each file of the plurality of files to the content management system, receive an indication of a second file to be stored in the location by the content management system, wherein:
the second file is not part of the plurality of files;
determine the apply-to-all option was activated in relation to the plurality of files;
provide the value of the metadata field for the second file uploaded for storage and management to the content management system; and
provide a second interface that requests a second value of the second metadata field for the second file to be uploaded for storage and management to the content management system.

19. The system for applying metadata to multiple files managed by the content management system of claim 13, wherein the content management system is further configured to execute processor-readable instructions configured to cause the processor of the content management system to:
receive the value for the metadata field from the user computer system.

20. The system for applying metadata to multiple files managed by the content management system of claim 13, wherein the location is a folder managed by the content management system.

* * * * *